(12) United States Patent
Swanson et al.

(10) Patent No.: US 8,007,852 B2
(45) Date of Patent: Aug. 30, 2011

(54) METHOD FOR PRODUCTION OF FROZEN VEGETABLES OR FRUITS

(75) Inventors: Wade H. Swanson, Modesto, CA (US); Ingrid A. Montgomery, Stockton, CA (US); Abizer M. Khairullah, Morgan Hill, CA (US)

(73) Assignee: Olam West Coast, Inc., Fresno, CA (US)

( * ) Notice: Subject to any disclaimer, the term of this patent is extended or adjusted under 35 U.S.C. 154(b) by 34 days.

(21) Appl. No.: 10/298,873

(22) Filed: Nov. 18, 2002

(65) Prior Publication Data

US 2004/0096559 A1 May 20, 2004

(51) Int. Cl.
*A23L 1/212* (2006.01)

(52) U.S. Cl. .......... 426/615; 426/640; 426/524

(58) Field of Classification Search ............. 426/444, 426/385, 615
See application file for complete search history.

(56) References Cited

U.S. PATENT DOCUMENTS

| | | | |
|---|---|---|---|
| 2,388,298 A | 11/1945 | Stephens | |
| 2,703,761 A * | 3/1955 | Todd | 426/393 |
| 3,098,750 A | 7/1963 | Prater et al. | |
| 3,188,750 A * | 6/1965 | Davis et al. | 34/287 |
| 3,408,208 A * | 10/1968 | Lamb | 426/615 |
| 3,408,209 A * | 10/1968 | Cording, Jr. et al. | 426/447 |
| 3,493,400 A | 2/1970 | Truckenbrodt et al. | |
| 3,573,937 A | 4/1971 | Sarna | |
| 4,002,772 A * | 1/1977 | Haas | 426/281 |
| 4,054,672 A * | 10/1977 | Inoue et al. | 426/244 |
| 4,254,153 A * | 3/1981 | Ross et al. | 426/441 |
| 4,332,824 A * | 6/1982 | Kahn et al. | 426/330.3 |
| 4,350,711 A * | 9/1982 | Kahn et al. | 426/102 |
| 4,390,550 A * | 6/1983 | Kahn et al. | 426/102 |
| 4,478,868 A * | 10/1984 | Ariss et al. | 426/641 |
| 4,647,469 A * | 3/1987 | Jakobsson et al. | 426/524 |
| 5,110,609 A * | 5/1992 | Lewis et al. | 426/402 |
| 5,155,923 A | 10/1992 | Wireman et al. | |
| 5,256,438 A * | 10/1993 | Lewis et al. | 426/615 |
| 5,393,543 A | 2/1995 | Laufer | |
| 5,447,737 A | 9/1995 | Blandine et al. | |
| 5,609,902 A | 3/1997 | Inakuma et al. | |
| 5,645,876 A * | 7/1997 | Subramaniam et al. | 426/50 |
| 5,723,167 A * | 3/1998 | Lewis et al. | 426/640 |
| 5,747,087 A | 5/1998 | Fosbol et al. | |
| 5,858,446 A * | 1/1999 | Lewis et al. | 426/615 |
| 5,916,624 A * | 6/1999 | Ajmera | 426/634 |
| 5,955,130 A | 9/1999 | Gagliardi et al. | |
| 6,004,590 A | 12/1999 | Subramaniam et al. | |
| 6,086,933 A | 7/2000 | Rockstrom | |
| 6,099,882 A | 8/2000 | Risner, Jr. et al. | |
| 6,468,573 B1 | 10/2002 | Herrick et al. | |
| 6,599,547 B1 | 7/2003 | Villagran et al. | |
| 7,438,943 B2 | 10/2008 | Khairullah et al. | |
| 2004/0234659 A1 | 11/2004 | Linton | |

FOREIGN PATENT DOCUMENTS

| | | |
|---|---|---|
| EP | 0289060 | 11/1988 |
| GB | 2225521 | * 6/1990 |
| JP | 54140759 | 11/1979 |
| JP | 57152861 | 9/1982 |
| JP | 63198950 | 8/1988 |
| JP | 6087731 | 11/1994 |
| JP | 10084920 | 4/1998 |
| JP | 10150963 | 6/1998 |
| JP | 41-11-127775 | 5/1999 |
| JP | 2000023648 | 1/2000 |
| JP | 2000-125799 | 5/2000 |
| JP | 2000197446 | 7/2000 |
| JP | 2002-051695 | 2/2002 |
| WO | WO 2004/103131 A2 | 12/2004 |

OTHER PUBLICATIONS

Potter, N. 1973. Food Science, 2nd edition. The AVI Publishing Co, Inc., Westport, CT, p. 228-231.*
EP Application No. 04811864.0: Supplementary European Search report dated Dec. 8, 2010 (6 pages).
Hoeft et al, "A Research Note-Cryogenic Freezing of Tomato Slices," *Journal of Food Science*, vol. 38, pp. 362-364 (1973).
Potter, *Food Science, Second Edition*, The AVI Publishing Co., Inc., Westport, CT, pp. 228-235 (1973).
U.S. Appl. No. 12/234,797: Non-Final Office Action dated Dec. 10, 2009, including references cited therein (8 pages).
U.S. Appl. No. 12/234,797: Final Office Action dated Jun. 3, 2010, including references cited therein (12 pages).
U.S. Appl. No. 12/234,797: Advisory Action dated Aug. 10, 2010 (2 pages).
U.S. Appl. No. 12/234,797: Non-Final Office Action dated Dec. 13, 2010, including references cited therein (12 pages).
A Research Note—Cryogenic Freezing of Tomato Slices R. Hoeft, R.P. Bates, and E.M. Ahmed, Food Science Department, University of Florida p. 362—Journal of Food Science—vol. 38 (1973).
U.S. Appl. No. 12/234,797: Notice of Allowance and Fee(s) Due dated Apr. 14, 2011 and related papers (4 pages).

* cited by examiner

*Primary Examiner* — Carolyn A Paden
(74) *Attorney, Agent, or Firm* — McDermott Will & Emery LLP (57) ABSTRACT

The present invention relates to a method for producing frozen and dehydro-frozen vegetables and fruits, wherein the method includes the method of cryogenically freezing the fruits or vegetables.

24 Claims, 4 Drawing Sheets

FIG. 1

RESULTS

ANALYTICAL

| Sample | Description | Cored Start Wt | Diced Wt | Fresh Solids | PreFreeze Wt | Frozen Wt | Frozen Solids | Reduction | Recovery |
|---|---|---|---|---|---|---|---|---|---|
| I. Red Pepper | | | | | | | | | |
| A | IQF Red Pepper Dices - Static Freeze | 1546 | 1410 | 8.6% | 1174 | 1070 | 8.8% | 2.3% | 69.2% |
| B | IQF Red Pepper Dices - Liquid Nitrogen Freeze | 1546 | 1260 | 8.6% | 1030 | 1024 | 8.9% | 3.4% | 66.2% |
| C | CM Red Pepper Dices - Static Freeze | 1546 | 1398 | 8.6% | 690 | 730 | 15.4% | 44.2% | 47.2% |
| D | CM Red Pepper Dices - Liquid Nitrogen Freeze | 1546 | 1398 | 8.6% | 806 | 798 | 14.3% | 39.9% | 51.6% |
| II. Green Pepper | | | | | | | | | |
| A | IQF Green Pepper Dices - Static Freeze | 1559 | 1450 | 5.8% | 1246 | 1130 | 7.2% | 19.4% | 72.5% |
| B | IQF Green Pepper Dices - Liquid Nitrogen Freeze | 1331 | 1238 | 5.8% | 1096 | 1058 | 6.0% | 3.3% | 79.5% |
| C | CM Green Pepper Dices - Static Freeze | 3118 | 2900 | 5.8% | 1718 | 1570 | 10.8% | 46.3% | 50.3% |
| D | CM Green Pepper Dices - Liquid Nitrogen Freeze | 3075 | 2860 | 5.8% | 1604 | 1580 | 10.3% | 43.7% | 51.4% |
| III. Tomato | | | | | | | | | |
| A | IQF Tomato Dices - Static Freeze | 1796 | 1650 | 6.2% | 1416 | 1294 | 6.5% | 4.6% | 72.0% |
| B | IQF Tomato Dices - Liquid Nitrogen Freeze | 1843 | 1764 | 6.6% | 1272 | 1224 | 8.6% | 23.3% | 66.4% |
| C | CM Tomato Dices - Static Freeze | 2362 | 2164 | 6.2% | 1228 | 1112 | 9.8% | 36.7% | 47.1% |
| D | CM Tomato Dices - Liquid Nitrogen Freeze | 2339 | 2242 | 6.6% | 1168 | 1152 | 20.5% | 67.8% | 49.3% |
| IV. Onion | | | | | | | | | |
| A | IQF Onion Dices - Static Freeze | 2008 | 1978 | 9.6% | 1964 | 1816 | 9.2% | -4.3% | 90.4% |
| B | IQF Onion Dices - Liquid Nitrogen Freeze | 2242 | 2176 | 9.6% | 2134 | 2058 | 8.9% | -7.9% | 91.8% |
| C | CM Onion Dices - Static Freeze | 2663 | 2634 | 9.6% | 1780 | 1657 | 13.0% | 26.2% | 62.2% |
| D | CM Onion Dices - Liquid Nitrogen Freeze | 2678 | 2638 | 9.6% | 1648 | 1520 | 12.7% | 24.4% | 56.8% |

FIG. 2

RESULTS

| Sample | SENSORY Description | Syneresis* % Loss | Texture Crispness | Texture Description | Flavor Description | Appearance Frozen Description | Appearance Thawed Description |
|---|---|---|---|---|---|---|---|
| I. Red Pepper | | | | | | | |
| A | IQF Red Pepper Dices - Static Freeze | 27.5% | 3 | Soft | IQF has less pepper flavor than CM which is concentrated | The liquid Nitrogen frozen samples are slightly lighter in color | All 4 thawed samples are close in color |
| B | IQF Red Pepper Dices - Liquid Nitrogen Freeze | 26.0% | 6 | Crisp & Yielding | | | |
| C | CM Red Pepper Dices - Static Freeze | 9.5% | 5 | Crisp & Yielding | | | |
| D | CM Red Pepper Dices - Liquid Nitrogen Freeze | 15.5% | 8 | Crisp & Turgid | | | |
| II. Green Pepper | | | | | | | |
| A | IQF Green Pepper Dices - Static Freeze | 35.0% | 3 | Soft | IQF has less pepper flavor than CM which is concentrated | IQF liquid Nitrogen lightested CM Static has the darkest | Thawed IQF is lighter than the CM samples |
| B | IQF Green Pepper Dices - Liquid Nitrogen Freeze | 22.5% | 5 | Crisp | | | |
| C | CM Green Pepper Dices - Static Freeze | 17.0% | 6 | Crisp | | | |
| D | CM Green Pepper Dices - Liquid Nitrogen Freeze | 14.0% | 8 | Crisp & Turgid | | | |
| III. Tomato | | | | | | | |
| A | IQF Tomato Dices - Static Freeze | 31.0% | 2 | Mushy | IQF has weak watery flavor CM has stronger concentrated flavor | The liquid Nitrogen frozen samples are slightly lighter in color | IQF looks plumper and watery, CM looks concentrated |
| B | IQF Tomato Dices - Liquid Nitrogen Freeze | 21.5% | 6 | Firm & Crisp | | | |
| C | CM Tomato Dices - Static Freeze | 23.5% | 4 | Soft | | | |
| D | CM Tomato Dices - Liquid Nitrogen Freeze | 14.0% | 8 | Crisp & Turgid | | | |
| IV. Onion | | | | | | | |
| A | IQF Onion Dices - Static Freeze | 33.0% | 3 | Soft & Yielding | IQF has less onion flavor than CM | Hard to tell color difference | IQF look slightly lighter color |
| B | IQF Onion Dices - Liquid Nitrogen Freeze | 44.0% | 5 | Crisp & Yielding | | | |
| C | CM Onion Dices - Static Freeze | 18.0% | 4 | Crisp & Yielding | | | |
| D | CM Onion Dices - Liquid Nitrogen Freeze | 17.5% | 7 | Crisp & Turgid | | | |

METHOD FOR PRODUCTION OF FROZEN VEGETABLES OR FRUITS

FIELD OF INVENTION

The present invention relates to a method for producing frozen vegetables or fruits and the resultant frozen product. The method includes the step of cryogenically freezing the vegetables or fruits.

BACKGROUND OF INVENTION

It is known to either dry or freeze vegetables and fruits for use by consumers. Additionally, it is known to use these two processes in combination to produce frozen dried products, also known as dehydro-frozen, or controlled moisture frozen. While these three methods are well suited to preserve fruits or vegetables, all three methods suffer from various problems.

Dried products have limited uses. Many commercial food products require fresh or fresh-like products for use in manufacturing such products. Additionally, dried products are not always readily substituted for fresh products.

Frozen products produced according to traditional methods suffer from a breakdown in the vegetable or fruit cell wall structure and, as such, have a low textural crispness. Crispness generally relates to the amount of water found in the cells of the vegetable or fruit, and translates into plant textural firmness upon mastication. Crispness is also a function of the structural integrity of the cells. A crisp vegetable is typically imbibed with water, has an intact cell wall structure, and, as such, has a firm, crisp texture. Most importantly, crisp vegetables and fruits have a crunchy and firm texture. For example, turgid or crisp celery will be crisp and crunchy; non-turgid or low crispness celery will be limp. When the cell walls break, water exits and crispness decreases. This means that the product will have a poor or mushy texture and will not retain suitable amounts of water. Typically, with slower freezing techniques, upon thawing, water leaches out of a vegetable or fruit product that has been frozen, resulting in a low texture limp product. As such, a product having fresh-like characteristics is not produced. It is desired to have a frozen product that has a textural crispness similar to a fresh product. It is further desired to have a method for freezing a product other than a mechanical freezer, as this has not worked in producing crisp textured vegetables.

It is further known that products can be partially dried and then frozen in an attempt to preserve or improve crispness by optimizing water content before freezing. Such products, when slow frozen, still suffer from having textural crispness that is not close enough to a fresh-like product. Often the cell wall structure in these products has been damaged.

For these reasons, it is desired to have a process or method for producing a frozen fruit or vegetable which has a crispness similar to a fresh product. It is further desired to have a product that has storage characteristics similar to that of a frozen, or partially dehydrated and then frozen (dehydro-frozen) product. For these reasons, it is desired to have a method or process for producing a frozen product that, when thawed, has fresh-like characteristics, but which can be stored for extended periods of time.

SUMMARY OF INVENTION

The present invention relates to a method for producing frozen vegetables or fruits that, upon thawing, have crispness, sometimes referred to as turgidity, characteristics similar to a fresh product. The frozen product can be dehydro-frozen or frozen only. Dehydro-frozen is the most preferred method of preservation. The dehydro-frozen method includes the step of cryogenically freezing the selected vegetable or fruit after it has been partially dried.

The method is initiated by obtaining an amount of a fleshy mesocarp product. The fleshy mesocarp product can be selected from the group consisting of any fruit or vegetable having a fleshy mesocarp. Such products include any of a variety of fruits and vegetables. In particular, the mesocarp product can be selected from the group consisting of lettuce and cabbage, bell peppers (red and green), jalapeno peppers, Anaheim peppers, tomatoes, carrots, broccoli, celery, onions, potatoes, cauliflower, corn, peas, green beans, grapes, peaches, melons, and apples.

Preferably, the product is dried, in particular, air dried, (but the drying step could be done by osmotically removing water) to produce a partially dried product. As such, any of a variety of methods can be used to remove water. The drying step can be done before or after freezing. Preferably, the product is frozen after drying. The freezing step can be accomplished using a cryogenic freezer or a mechanical freezer in combination with a cryogenic freezer. The freezing step preferably includes freezing the dried product cryogenically.

The partially dried product has a moisture level reduced by between 15% and 75% total moisture of the product prior to treatment. Moisture reduction will depend, in part, on the product selected.

The present method can be part of a continuous process. The drying step will be conducted long enough to remove moisture but not shrivel the product or cause a significant loss of crispness. The resulting cryogenically frozen food product will have a weight loss from moisture removal of at least 15%, and a texture equal to a fresh texture when thawed.

BRIEF DESCRIPTION OF DRAWINGS

FIG. 2 is a graph showing analytical data related to various treated products, with the results showing the difference between static freezing and liquid nitrogen freezing processes;

FIG. 3 is a graph showing sensory data related to the various treated products; and, FIG. 4 is a graph showing texture data related to the various treated products.

DETAILED DESCRIPTION

The present invention relates to a method for producing frozen and dehydro-frozen vegetables or fruits, with dehydro-frozen products the most preferred. Additionally, the present invention relates to the resultant dehydro-frozen product. The method includes the steps of cryogenically freezing an amount of fruits or vegetables, which have been partially dried. The resultant dehydro-frozen fruits or vegetables will have preferred crispness characteristics when thawed.

Any of a variety of fruits or vegetables can be used with the present method. Essentially, any fruit or vegetable that has a fleshy mesocarp may be treated with the present method. Suitable fruits and vegetables include lettuce, cabbage, bell peppers (red and green), jalapeno peppers, Anaheim peppers, tomatoes, carrots, broccoli, celery, onions, potatoes, cauliflower, corn, peas, green beans, grapes, peaches, melons, and apples. This list of fruits and vegetables will be referred to from this point forward as the "mesocarp product(s)."

The process or method can be initiated by obtaining any amount of a mesocarp product, if the method is part of a continuous process. If a batch process is selected, the amount initially treated is limited by the size of the equipment. The mesocarp product should be comparatively fresh in order to ensure adequate end-product taste and texture characteristics.

The process is preferably initiated by removing seeds, cores, and other products not desired for consumption. The product is then preferably diced or sliced. The size of the resultant product is determined in part by the desired characteristics for the finished product.

Once the mesocarp product is obtained, it is partially dried. Such a step will preferably reduce the total moisture level from between 15% to 75% of the starting mesocarp product moisture level. A more preferred moisture removal will range between 25% and 60%. More preferably, the total moisture level will be reduced by 50% of the starting mesocarp product. Any of a variety of times and temperatures may be used to dry the mesocarp product, as long as the product is not scorched or blistered, and an adequate amount of moisture is removed in a desired time period. The mesocarp product can be air dried or osmotically dried. Preferably, a belt or continuous drying system will be used. A preferred drying temperature ranges between 200° F.-300° F., with the drying time ranging between 15 minutes and 45 minutes. An amount of a partially dried mesocarp product is resultingly produced.

The freezing step of the dried product can include cryogenically freezing, or mechanically and cryogenically freezing. It is most preferred, however, to cryogenically freeze the partially dried mesocarp product. Cryogenic freezing will involve exposing the mesocarp product to temperatures equal to approximately −321° F. (in liquid nitrogen) for about 1 minute. Liquid nitrogen or liquid carbon dioxide may be used. Cryogenic freezers can be purchased from any of a variety of commercial providers. Cryogenic freezing is crucial to the present invention because it produces a fresh crisp product. It is believed that cryogenic freezing prevents water in the mesocarp product from expanding and thereby breaking the cell wall. Any method that maintains the cell wall during freezing may be used.

The resultant partially dried, cryogenically frozen mesocarp product will have superior characteristics as compared to other frozen or dehydro-frozen products. In particular, when thawed, the present product will have superior crispness characteristics, meaning there is less leaching of water, and the resultant product has a firmer, crisper texture. The resultant product will have a texture equal to at least 8, and preferably 9, on a hedonic texture turgidity scale with 10 as perfect fresh texture. Thus, the product will have a texture and crispness similar to a fresh product. The product will have between 15% and 75% less moisture than a fresh product.

Additions, such as calcium chloride, can be added to the mesocarp product prior to freezing. The additives can be added for a variety of reasons, including promoting improved texture and color.

EXAMPLES

Example 1

One hundred twenty pounds (120 lbs.) of fresh red bell peppers were obtained. The core, seeds, and stems were removed from the red bell peppers, and the peppers were then washed and inspected to ensure that they were of sufficient quality. After inspection, the peppers were diced into 3/8" by 3/8" pieces (100 pounds diced weight). It was determined that the peppers were comprised of approximately 10% solids and 90% water. The peppers were placed on a tray and air dried for 15 minutes at 250° F., to produce a dried product that weighed 50 pounds, and was comprised of 20% solids.

The dried red peppers were then frozen cryogenically. A cryogenic freezing device manufactured by Air Products was used. The peppers were contacted, or frozen, in liquid nitrogen having a temperature of −321° F., for less than one minute. The frozen peppers were then packaged and stored.

Example 2

Figure 1:
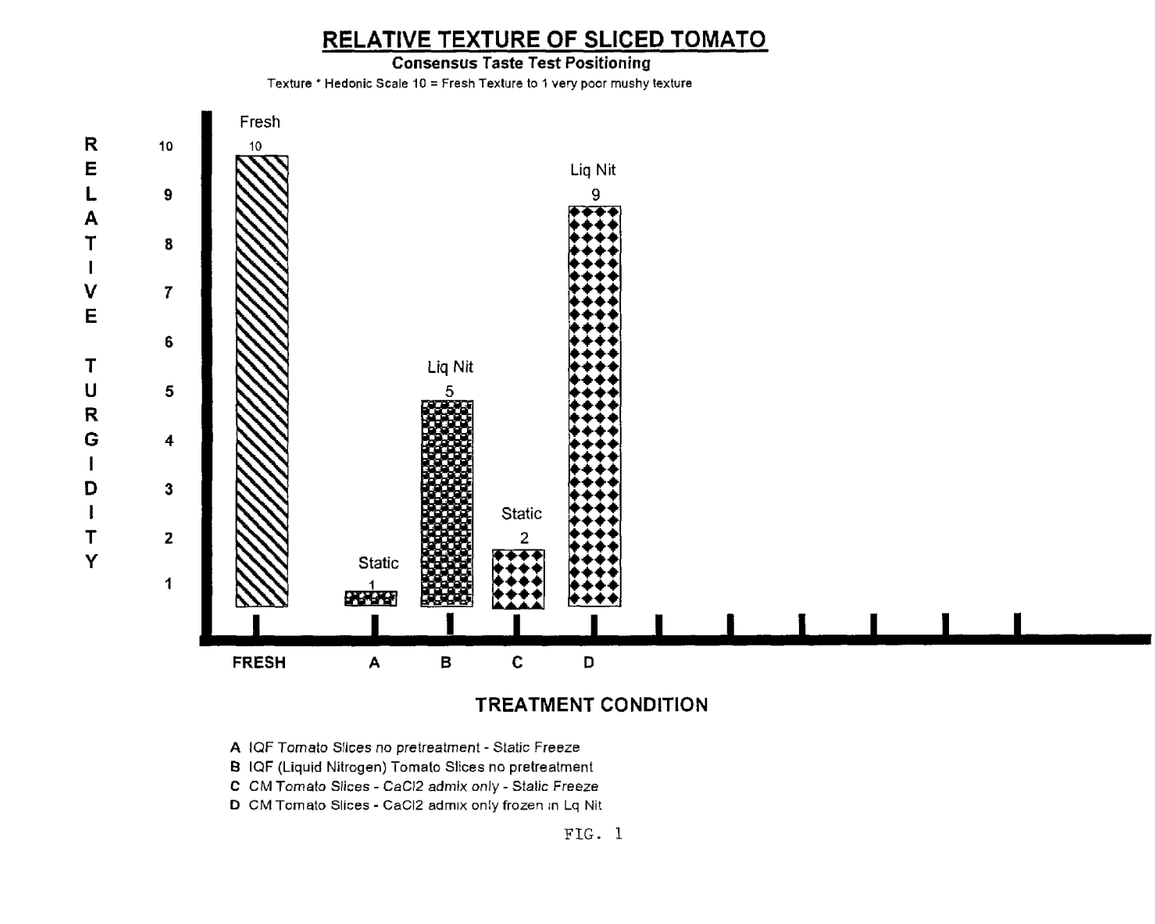
FIG. 1 is a graph showing the turgidity of tomatoes treated with different methods.

As shown in FIG. 1, tomatoes were treated with various processes and analyzed to determine the turgidity or crispness of the resulting tomatoes. As is seen, a fresh tomato has a texture crispness equal to 10. The tomatoes were divided into groups and then sliced and frozen. The groups were frozen with either a static or mechanical freezer, liquid nitrogen without any pre-treatment, a static freezer with calcium chloride added prior to freezing, or calcium chloride added to the tomatoes prior to freezing with liquid nitrogen. The texture crispness of the frozen/thawed tomatoes was then measured using the following device: TA.XT (plus) Texture Analyzer. As can be seen in FIG. 1, the tomato pre-treated with calcium chloride and liquid nitrogen had superior texture characteristics.

Example 3

Samples of red bell pepper, green bell pepper, red Roma tomato, and yellow jumbo market onions were trimmed, washed, and diced to yield edible mesocarp and then divided into diced sub-samples. Approximately half of the sub-samples were processed into Instantly Quick Frozen (IQF) product. The other half was partially dried and processed as dehydro-frozen, or by controlled moisture (CM). Before freezing, the samples were further divided and frozen in either liquid nitrogen (fast freeze) or mechanically (slow freeze—static). After freezing, the products were compared for thawed moisture loss (syneresis) and for textural turgidity or crispness against fresh product.

Products were obtained and treated as listed below.

A. Red Pepper—IQF Red Pepper Dices—Static Freeze.
  1. Select and core several large red peppers and weigh (approximately 2000 grams (gm);
  2. J-dice peppers 3/8"×3/8";
  3. Blanch for 2 minutes in table blancher, then air cool;
  4. Tray-up and freeze the peppers by placing in 0° F. static air, stir periodically the first hour to create free-flowing condition;
  5. Check weight of frozen product and check Vacuum Oven (VO) solids (a standard industry technique to measure solids content); and,
  6. Hold for sensory comparison.

B. Red Pepper—IQF Red Pepper Dices—Liquid Nitrogen Freeze.
  1. Select and core several large red peppers and weigh (approximately 2000 gm);
  2. J-dice peppers 3/8"×3/8";
  3. Blanch for 2 minutes in table blancher, then air cool;
  4. Place product in lab perforated basket, then drain and check weight after draining;
  5. Freeze the product by placing in liquid nitrogen for 30 seconds, then remove;
  6. Check weight of frozen product and check VO solids; and,
  7. Hold for sensory comparison.

C. Red Pepper—CM Red Pepper Dices—Static Freeze.
 1. Select and core several large red peppers and weigh (approximately 2000 gm);
 2. J-dice peppers 3/8"×3/8";
 3. Place product on lab A/D tray, check weight after drain;
 4. A/D 50% in lab P&S using 130° F. air;
 5. HAPS/Blanch 30 seconds on lab table blancher—air cool;
 6. Tray-up and freeze the peppers by placing in 0° F. static air, stir periodically the first hour to create free-flowing condition;
 7. Check weight of frozen product and check VO solids; and,
 8. Hold for sensory comparison.

D. Red Pepper—CM Red Pepper Dices—Liquid Nitrogen Freeze.
 1. Select and core several large red peppers and weigh (approximately 2000 gm);
 2. J-dice peppers 3/8"×3/8";
 3. Place product on lab A/D; tray check weight after drain;
 4. A/D 50% in lab P&S using 130° F. air;
 5. HAPS/Blanch 30 seconds on lab table blancher—air cool;
 6. Place product in lab perforated basket, then drain and check weight after drain;
 7. Freeze the product by placing in liquid nitrogen for 30 seconds then remove;
 8. Check weight of frozen product and check VO solids; and,
 9. Hold for sensory comparison.

A. Green Pepper—IQF Green Pepper Dices—Static Freeze.
 1. Select and core several large green peppers and weigh (approximately 2000 gm);
 2. J-dice peppers 3/8"×3/8";
 3. Blanch for 2 minutes in table blancher, then air cool;
 4. Tray-up and freeze the peppers by placing in 0° F. static air, stir periodically the first hour to create free-flowing condition;
 5. Check weight of frozen product and check VO solids; and,
 6. Hold for sensory comparison.

B. Green Pepper—IQF Green Pepper Dices—Liquid Nitrogen Freeze.
 1. Select and core several large green peppers and weigh (approximately 2000 gm);
 2. J-dice peppers 3/8"×3/8";
 3. Blanch for 2 minutes in table blancher, then air cool;
 4. Place product in lab perforated basket, then drain and check weight after draining;
 5. Freeze the product by placing in liquid nitrogen for 30 seconds, then remove;
 6. Check weight of frozen product and check VO solids; and,
 7. Hold for sensory comparison.

C. Green Pepper—CM Green Pepper Dices—Static Freeze.
 1. Select and core several large green peppers and weigh (approximately 2000 gm);
 2. J-dice peppers 3/8"×3/8";
 3. Place product on lab AID tray; check weight after drain;
 4. A/D 50% in lab P&S using 130° F. air;
 5. HAPS/Blanch 30 seconds on lab table blancher—air cool;
 6. Tray-up and freeze the peppers by placing in 0° F. static air, stir periodically the first hour to create free-flowing condition;
 7. Check weight of frozen product and check VO solids; and,
 8. Hold for sensory comparison.

D. Green Pepper—CM Green Pepper Dices—Liquid Nitrogen Freeze.
 1. Select and core several large green peppers and weigh (approximately 2000 grams (gm);
 2. J-dice peppers 3/8"×3/8";
 3. Place product on lab A/D; tray check weight after drain;
 4. A/D 50% in lab P&S using 130° F. air;
 5. HAPS/Blanch 30 seconds on lab table blancher—air cool;
 6. Place product in lab perforated basket, then drain and check weight after drain;
 7. Freeze the product by placing in liquid nitrogen for 30 seconds then remove;
 8. Check weight of frozen product and check VO solids; and,
 9. Hold for sensory comparison.

A. Tomato—IQF Tomato Dices—Static Freeze.
 1. Obtain 15 red Roma tomatoes from local produce or production;
 2. G-Dice 3/8"×3/8"×3/8" (check solids);
 3. Prepare 1 gallon of a 2.2% $CaCl_2$ solution (80 gm $CaCl_2$ per 1 gallon water);
 4. Admix 470 gm of treatment solution with 2270 gm of sliced tomato. Mix in lab mixer 1 minute;
 5. Tray-up and freeze the product by placing in 0° F. static air, stir periodically the first hour to create free-flowing condition;
 6. Check weight of frozen product and check VO solids; and,
 7. Hold for sensory comparison. Label and MAP package frozen product.

B. Tomato—IQF Tomato Dices—Liquid Nitrogen Freeze.
 1. Obtain 15 red Roma tomatoes from local produce or production;
 2. G-Dice 3/8"×3/8"×3/8" (check solids);
 3. Prepare I gallon of a 2.2% $CaCl_2$ solution (80 gm $CaCl_2$ per 1 gallon water);
 4. Admix 470 gm of treatment solution with 2270 gm of sliced tomato. Mix in lab mixer 1 minute;
 5. Place product in lab perforated basket, then drain and check weight after drain;
 6. Freeze the product by placing in liquid nitrogen for 30 seconds, then remove;
 7. Check weight of frozen product and check VO solids; and,
 8. Hold for sensory comparison. Label and MAP package frozen product.

C. Tomato—CM Tomato Dices—Static Freeze.
 1. Obtain 15 red Roma tomatoes from local produce or production;
 2. G-Dice (3-dimensional dicer) 3/8"×3/8"×3/8" (check solids);
 3. Prepare 1 gallon of a 2.2% $CaCl_2$ solution (80 gm $CaCl_2$ per 1 gallon water);
 4. Admix 470 gm of treatment solution with 2270 gm of sliced tomato. Mix in lab mixer 1 minute;
 5. Place product on lab AID tray; check weight after drain;
 6. A/D removing 35% weight as water in lab P&S dryer using 130° F. air. This provides a partially dried, concentrated product for subsequent freezing;
 7. Tray-up and freeze the peppers by placing in 0° F. static air; stir periodically the first hour to create free-flowing condition;

8. Check weight of frozen product and check VO solids; and,

Hold for sensory comparison. Label & MAP package frozen product.

D. Tomato—CM Tomato Dices—Liquid Nitrogen Freeze.
1. Obtain 15 red Roma tomatoes from local produce or production;
2. G-Dice ⅜"×⅜"×⅜" (check solids);
3. Prepare 1 gallon of a 2.2% $CaCl_2$ solution (80 gm $CaCl_2$ per 1 gallon water);
4. Admix 470 gm of treatment solution with 2270 gm of sliced tomato. Mix in lab mixer 1 minute;
5. Place product on lab A/D tray; check weight after drain;
6. A/D removing 35% weight as water in lab P&S using 130° F. air;
7. Place product in lab perforated basket;
8. Freeze the product by placing in liquid nitrogen for 30 seconds, then remove;
9. Check weight of frozen product and check VO solids; and,
10. Hold for sensory comparison. Label and MAP package frozen product.

A. Onion—IQF Onion Dices—Static Freeze.
1. Obtain 8 yellow market onions from local produce;
2. Remove peel and defects;
3. G-dice ⅜"×⅜"×⅜" (check solids and weigh);
4. Tray-up and freeze the onions by placing in 0° F. static air, stir periodically the first hour to create free-flowing condition;
5. Check weight of frozen product and check VO solids; and,
6. Hold for sensory comparison.

B. Onion—IQF Onion Dices—Liquid Nitrogen Freeze.
1. Obtain 8 yellow market onions from local produce;
2. Remove peel and defects;
3. G-dice ⅜"×⅜"×⅜" (check solids and weigh);
4. Place product in lab perforated basket;
5. Freeze the product by placing in liquid nitrogen for 30 seconds, then remove;
6. Check weight of frozen product and check VO solids; and,
7. Hold for sensory comparison.

C. Onion—CM Onion Dices—Static Freeze.
1. Obtain 8 yellow market onions from local produce;
2. Remove peel and defects;
3. G-dice ⅜"×⅜"×⅜" (check solids and weigh);
4. Place product on lab A/D tray, check weight after drain;
5. A/D removing 30% weight as water in lab P&S dryer using 130° F. air;
6. Freeze the dices by placing in 0° F. static air, stir periodically the first hour to create the free-flowing condition;
7. Check weight of frozen product and check VO solids; and,
8. Hold for sensory comparison.

D. Onion—CM Onion Dices—Liquid Nitrogen Freeze.
1. Obtain 8 yellow market onions from local produce;
2. Remove peel and defects;
3. G-dice ⅜"×⅜"×⅜" (check solids and weigh);
4. Place product on lab A/D tray, check weight after drain;
5. A/D removing 30% weight as water in lab P&S dryer using 130° F. air;
6. Place product in lab perforated basket;
7. Freeze the product by placing in liquid nitrogen for 30 seconds, then remove;
8. Check weight of frozen product and check VO solids; and,
9. Hold for sensory comparison.

The products from above were analyzed for syneresis. An amount equal to 20 gm of frozen product was weighed and placed between two absorbent napkins. The product was allowed to thaw/temper for 5 hours at ambient conditions. The thawed product was weighed and % moisture loss was calculated.

|   |   | Start Wt | Thawed Wt | % Loss |
|---|---|---|---|---|
| | Red Pepper | | | |
| A | IQF Red Pepper Dices—Static Freeze | 20.0 | 14.5 | 27.5% |
| B | IQF Red Pepper Dices—Liquid Nitrogen Freeze | 20.0 | 14.8 | 26.0% |
| C | CM Red Pepper Dices—Static Freeze | 20.0 | 18.1 | 9.5% |
| D | CM Red Pepper Dices—Liquid Nitrogen Freeze | 20.0 | 16.9 | 15.5% |
| | Green Pepper | | | |
| A | IQF Green Pepper Dices—Static Freeze | 20.0 | 13.0 | 35.0% |
| B | IQF Green Pepper Dices—Liquid Nitrogen Freeze | 20.0 | 15.5 | 22.5% |
| C | CM Green Pepper Dices—Static Freeze | 20.0 | 16.6 | 17.0% |
| D | CM Green Pepper Dices—Liquid Nitrogen Freeze | 20.0 | 17.2 | 14.0% |
| | Tomato | | | |
| A | IQF Tomato Dices—Static Freeze | 20.0 | 13.8 | 31.0% |
| B | IQF Tomato Dices—Liquid Nitrogen Freeze | 20.0 | 15.7 | 21.5% |
| C | CM Tomato Dices—Static Freeze | 20.0 | 15.3 | 23.5% |
| D | CM Tomato Dices—Liquid Nitrogen Freeze | 20.0 | 17.2 | 14.0% |
| | Onion | | | |
| A | IQF Onion Dices—Static Freeze | 20.0 | 13.4 | 33.0% |
| B | IQF Onion Dices—Liquid Nitrogen Freeze | 20.0 | 11.2 | 44.0% |
| C | CM Onion Dices—Static Freeze | 20.0 | 16.4 | 18.0% |
| D | CM Onion Dices—Liquid Nitrogen Freeze | 20.0 | 16.5 | 17.5% |

Sensory—Texture, Flavor, and Appearance.

A side-by-side taste test was performed with two knowledgeable technicians. The parties agreed on relative texture value against fresh reference samples (rank and offer descriptions), relative flavor, and appearance comparisons by product. The results were graphed and are displayed in FIGS. 2-4.

FIG. 2 relates to the analytical test results on the various products. Cored start weight relates to the weight of the product after it is cored. Diced weight is the weight after the product has been chopped. Fresh solids relates to the % of solids in the product prior to treatment. Pre-freeze weight is the weight prior to freezing, and frozen weight is the weight after freezing. Frozen solids is the % by weight of solids in the product after freezing. Reduction is the percentage moisture lost. Recovery is the % of the total solids recovered. As can be seen in FIG. 2, cryogenic freezing improved recovery.

The following observations were made regarding the above products and are shown in FIG. 3. Within the treatments (IQF & CM), the cryogenically frozen (liquid nitrogen) samples had more textural crispness than the slow frozen (mechanical frozen samples). The CM samples had more textural crispness than the IQF samples. As a general rule, the IQF sample that was frozen in liquid nitrogen had a more crisp texture than the CM sample that was slow frozen. A clear texture distinction was made between the IQF samples that were mechanically (slow) frozen (mushier texture) and the CM samples that were liquid nitrogen (fast) frozen (crispier turgid texture). The CM frozen vegetables had a more concentrated vegetable flavor than IQF. Liquid nitrogen freezing produced a frozen product with a slightly lighter color than slower mechanical freezing. As expected, the CM samples showed less syneresis loss than IQF. It was concluded that the cryogenic method was superior.

Figure 4:
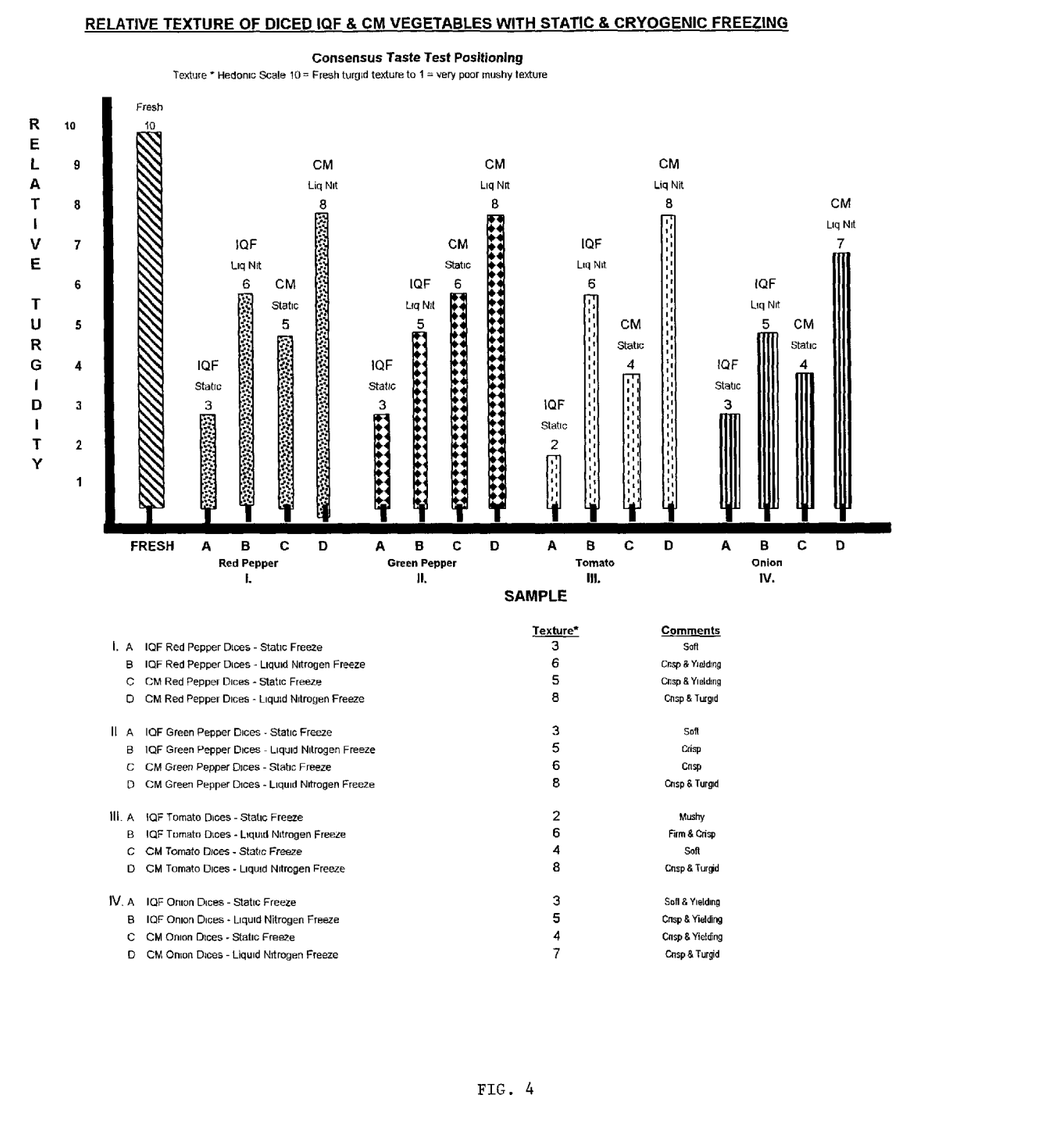

FIG. 4 illustrates data which further validates the improved texture results achieved with the present process. In all cases, products cryogenically frozen had superior characteristics. As such, the method of drying and cryogenically freezing produces a product with a superior texture.

Example 4

Sensory tests were conducted on various fruits and vegetables. The tests were done on IQF and CM products. Again, the products were divided into groups that were static frozen and groups which were quick frozen in liquid nitrogen. The products were thawed and tested.

As can be seen, the products frozen with liquid nitrogen were superior. In particular, CM samples that were then frozen in liquid nitrogen were superior.

Thus, there has been shown and described a technique combining partial dehydration and cryogenic freezing methods to produce superior thawed frozen vegetables which fulfills all the objects and advantages sought therefor. It is apparent to those skilled in the art, however, that many changes, variations, modifications, and other uses and applications to the technique combining partial dehydration and cryogenic freezing methods to produce superior thawed frozen vegetables are possible, and also such changes, variations, modifications, and other uses and applications which do not depart from the spirit and scope of the invention are deemed to be covered by the invention, which is limited only by the claims which follow.

What is claimed is:

1. A method for making a frozen food product, the method comprising:
    obtaining an amount of a raw fruit, raw vegetable, or combination thereof, wherein the raw fruit or raw vegetable comprises at least about 90% moisture by weight;
    air drying the raw fruit, raw vegetable or combination thereof to reduce the total moisture level of the raw fruit, raw vegetable, or combination thereof by 25% to 60% thereby producing a partially dried product comprising about 75% or more moisture by weight; and
    cryogenically freezing the partially dried product to produce a frozen food product;
    wherein the cryogenically freezing provides a frozen food product that comprises a frozen food product with a crispness similar to a fresh product when the frozen product is thawed at ambient conditions.

2. The method of claim 1, wherein said raw fruit, raw vegetable or combination thereof comprises a mesocarp.

3. The method of claim 2, wherein said raw fruit, raw vegetable or combination thereof is selected from a group consisting of bell peppers, jalapeno peppers, Anaheim peppers, tomatoes, grapes, peaches, melons, and apples.

4. The method of claim 1, wherein the cryogenically freezing step comprises freezing the partially dried product mechanically.

| | Samples Description | TA.XT, TA-65 Force (g) | TA.XT, TA-65 Area (g's) | Taste Score Sensory |
|---|---|---|---|---|
| A | IQF Red Pepper Dices—Static Freeze | 3,020.2 | 14,725.3 | 3 |
| B | IQF Red Pepper Dices—Liquid Nitrogen Freeze | 2,903.3 | 15,507.2 | 6 |
| C | CM Red Pepper Dices—Static Freeze | 2,404.2 | 15,139.5 | 5 |
| D | CM Red Pepper Dices—Liquid Nitrogen Freeze | 3,078.6 | 21,344.9 | 8 |
| A | IQF Green Pepper Dices—Static Freeze | 4,558.6 | 31,974.7 | 3 |
| B | IQF Green Pepper Dices—Liquid Nitrogen Freeze | 5,263.5 | 37,337.3 | 5 |
| C | CM Green Pepper Dices—Static Freeze | 5,765.2 | 41,725.8 | 6 |
| D | CM Green Pepper Dices—Liquid Nitrogen Freeze | 6,434.4 | 44,068.9 | 8 |
| A | IQF Tomato Dices—Static Freeze | 9,107.7 | 35,533.3 | 2 |
| B | IQF Tomato Dices—Liquid Nitrogen Freeze | 15,668.4 | 125,351.0 | 6 |
| C | CM Tomato Dices—Static Freeze | 15,708.2 | 111,184.1 | 4 |
| D | CM Tomato Dices—Liquid Nitrogen Freeze | 14,605.2 | 112,020.5 | 8 |
| A | IQF Onion Dices—Static Freeze | 12,755.1 | 89,192.8 | 3 |
| B | IQF Onion Dices—Liquid Nitrogen Freeze | 12,046.4 | 81,143.6 | 5 |
| C | CM Onion Dices—Static Freeze | 11,078.8 | 78,739.2 | 4 |
| D | CM Onion Dices—Liquid Nitrogen Freeze | 15,803.4 | 103,804.0 | 7 |

Force (g)—Peak Force using TA.XT Plus fitted with a TA-65 multipoint. "Force" required to push the TA-65 multipoint probe 95% of the way through 200 g of thawed 35° F.) product was recorded.
Total Work as Area (g's)—Also recorded total area under the Force/Time Curve.
Sensory—Consensus Taste Test Positioning—Texture
Hedonic Scale 10 = Fresh crisp texture to 1 = very poor mushy texture
Panel = Food Technologists skilled in developing products 5. The method of claim 1, wherein said raw fruit, raw vegetable or combination thereof is selected from a group consisting of lettuce and cabbage, bell peppers, jalapeno peppers, Anaheim peppers, tomatoes, carrots, broccoli, celery, onions, cauliflower, green beans, grapes, peaches, melons, and apples.

6. The method of claim 1, wherein said method is a continuous process.

7. The method of claim 1, wherein the drying step is conducted long enough to remove said moisture but not to shrivel the product or cause a loss of crispness.

8. The method of claim 1, wherein the raw fruit, raw vegetable or combination thereof is dried at a temperature of from about 200° F. to about 300° F.

9. The method of claim 8, wherein the raw fruit, raw vegetable or combination thereof is dried for from about 15 minutes to about 45 minutes.

10. The method of claim 1, wherein the partially dried product is cryogenically frozen at temperatures of approximately −321° F. in liquid nitrogen.

11. The method of claim 10, wherein the dried product is cryogenically frozen for about 1 minute.

12. The method of claim 1, further comprising blanching the partially dried product prior to cryogenic freezing.

13. The method of claim 1, further comprising treating the partially dried product with $CaCl_2$ prior to cryogenic freezing.

14. A cryogenically frozen food product comprising a partially dried raw fruit, raw vegetable, or combination thereof that has been cryogenically frozen, wherein the cryogenically freezing provides a frozen food product that comprises a frozen food product with a crispness similar to a fresh product when the frozen product is thawed at ambient conditions and wherein the raw fruit, raw vegetable, or combination thereof comprised at least 90% moisture by weight before being partially dried and the raw fruit, raw vegetable or combination thereof comprises a reduced total moisture of between 25% and 60% after being partially dried wherein the partially dried product comprises about 75% or more moisture by weight.

15. The cryogenically frozen product of claim 14, wherein said raw fruit, raw vegetable, or combination thereof comprises a mesocarp.

16. The cryogenically frozen product of claim 15, wherein said raw fruit, raw vegetable or combination thereof is selected from the group consisting of bell peppers, jalapeno peppers, Anaheim peppers, tomatoes, grapes, peaches, melons, and apples.

17. The cryogenically frozen product of claim 14, wherein the partially dried raw fruit, raw vegetable, or combination thereof comprises about 75% or more moisture by weight.

18. A method for making a frozen food product comprising:
   obtaining an amount of a raw fruit, raw vegetable, or combination thereof, wherein the raw fruit or raw vegetable comprises at least about 90% moisture by weight;
   osmotically drying the raw fruit, raw vegetable, or combination thereof to reduce the total moisture level of the raw fruit, raw vegetable, or combination thereof by between 25% and 60% thereby producing a partially dried product comprising about 75% or more moisture by weight; and
   cryogenically freezing the partially dried product for about 1 minute or less to produce a frozen food product; wherein the cryogenically freezing provides a frozen food product that comprises a frozen food product with a crispness similar to a fresh product when the frozen product is thawed at ambient conditions.

19. The cryogenically frozen food product of claim 14 wherein the cryogenically frozen food product comprises a reduced total moisture of between 25% and 60%.

20. The method of claim 18, wherein the partially dried product is cryogenically frozen at temperatures of approximately −321° F. in liquid nitrogen.

21. The method of claim 18, wherein the dried product is cryogenically frozen for about 1 minute.

22. The method of claim 18, wherein said raw fruit, raw vegetable or combination thereof is selected from a group consisting of lettuce and cabbage, bell peppers, jalapeno peppers, Anaheim peppers, tomatoes, carrots, broccoli, celery, onions, potatoes, cauliflower, corn, peas, green beans, grapes, peaches, melons, and apples.

23. The method of claim 18, further comprising blanching the partially dried product prior to cryogenic freezing.

24. The method of claim 18, further comprising treating the partially dried product with $CaCl_2$ prior to cryogenic freezing.

* * * * *